(12) United States Patent
Miyamae (10) Patent No.: US 9,697,081 B2
(45) Date of Patent: Jul. 4, 2017

(54) STORAGE CONTROL DEVICE AND DATA RECOVERY METHOD

(71) Applicant: FUJITSU LIMITED, Kawasaki-shi, Kanagawa (JP)

(72) Inventor: Takeshi Miyamae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 14/620,735

(22) Filed: Feb. 12, 2015

(65) Prior Publication Data

US 2015/0309902 A1    Oct. 29, 2015

(30) Foreign Application Priority Data

Apr. 25, 2014   (JP) .................................. 2014-091667

(51) Int. Cl.
  *G06F 11/10*    (2006.01)
(52) U.S. Cl.
  CPC ...... *G06F 11/1088* (2013.01); *G06F 11/1084* (2013.01)
(58) Field of Classification Search
  CPC .. G06F 11/0709; G06F 11/076; G06F 11/079; G06F 17/302; G06F 17/30371
  See application file for complete search history.

(56) References Cited

U.S. PATENT DOCUMENTS

| | | | |
|---|---|---|---|
| 2003/0126523 A1 | 7/2003 | Corbett | |
| 2005/0289387 A1* | 12/2005 | Hajji | G06F 11/1096 714/6.1 |
| 2006/0212748 A1 | 9/2006 | Mochizuki | |
| 2008/0184067 A1 | 7/2008 | Ito | |
| 2009/0172460 A1* | 7/2009 | Bobak | G06F 11/0709 714/2 |
| 2013/0124776 A1* | 5/2013 | Hallak | G06F 11/1076 711/102 |
| 2013/0246686 A1* | 9/2013 | Noborikawa | G06F 3/0604 711/102 |
| 2015/0074371 A1* | 3/2015 | Hashimoto | G06F 3/06 711/202 |

FOREIGN PATENT DOCUMENTS

| | | |
|---|---|---|
| JP | 2006-259894 | 9/2006 |
| JP | 2008-186400 | 8/2008 |
| JP | 2013-506191 | 2/2013 |

* cited by examiner

*Primary Examiner* — Jigar Patel
(74) *Attorney, Agent, or Firm* — Staas & Halsey LLP (57) ABSTRACT

A storage control device includes a processor. The processor is configured to acquire, when a first fault has occurred in a first storage device, first storage data to be used in recovery of the first storage device from a plurality of first storage control devices. The processor is configured to derive, when a second fault has occurred in a second storage device controlled by a second storage control device, first processed data from the first storage data. The first processed data is to be used in recovery of the second storage device. The processor is configured to notify the second storage control device of the first processed data.

6 Claims, 12 Drawing Sheets

STORAGE CONTROL DEVICE AND DATA RECOVERY METHOD

CROSS-REFERENCE TO RELATED APPLICATION

This application is based upon and claims the benefit of priority of the prior Japanese Patent Application No. 2014-091667, filed on Apr. 25, 2014, the entire contents of which are incorporated herein by reference.

FIELD

The embodiments discussed herein are related to a storage control device and a data recovery method.

BACKGROUND

Storage systems, such as distributed storage systems, ensure availability and reliability of data by using replication and redundant arrays of independent disks (RAID).

In such a distributed storage system, when a disk (storage device) becomes faulty, operations for recovery of the faulty disk are performed in the background of user applications.

Related techniques are disclosed in, for example, Japanese Laid-open Patent Publication No. 2006-259894, Japanese Laid-open Patent Publication No. 2008-186400, and Japanese National Publication of International Patent Application No. 2013-506191.

Recovery of a faulty disk involves data transfer from a normal disk. A network band is therefore used for recovery of the faulty disk. This affects the user applications in some cases. When a plurality of disks have become faulty, operations of recovering a faulty disk are performed independently for each faulty disk. For this reason, there are some cases where a larger network band is used for recovery and where a network band is used for recovery for a longer time.

SUMMARY

According to an aspect of the present invention, provided is a storage control device including a processor. The processor is configured to acquire, when a first fault has occurred in a first storage device, first storage data to be used in recovery of the first storage device from a plurality of first storage control devices. The processor is configured to derive, when a second fault has occurred in a second storage device controlled by a second storage control device, first processed data from the first storage data. The first processed data is to be used in recovery of the second storage device. The processor is configured to notify the second storage control device of the first processed data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described in detail with reference to the accompanying drawings.

First Embodiment

Figure 1:
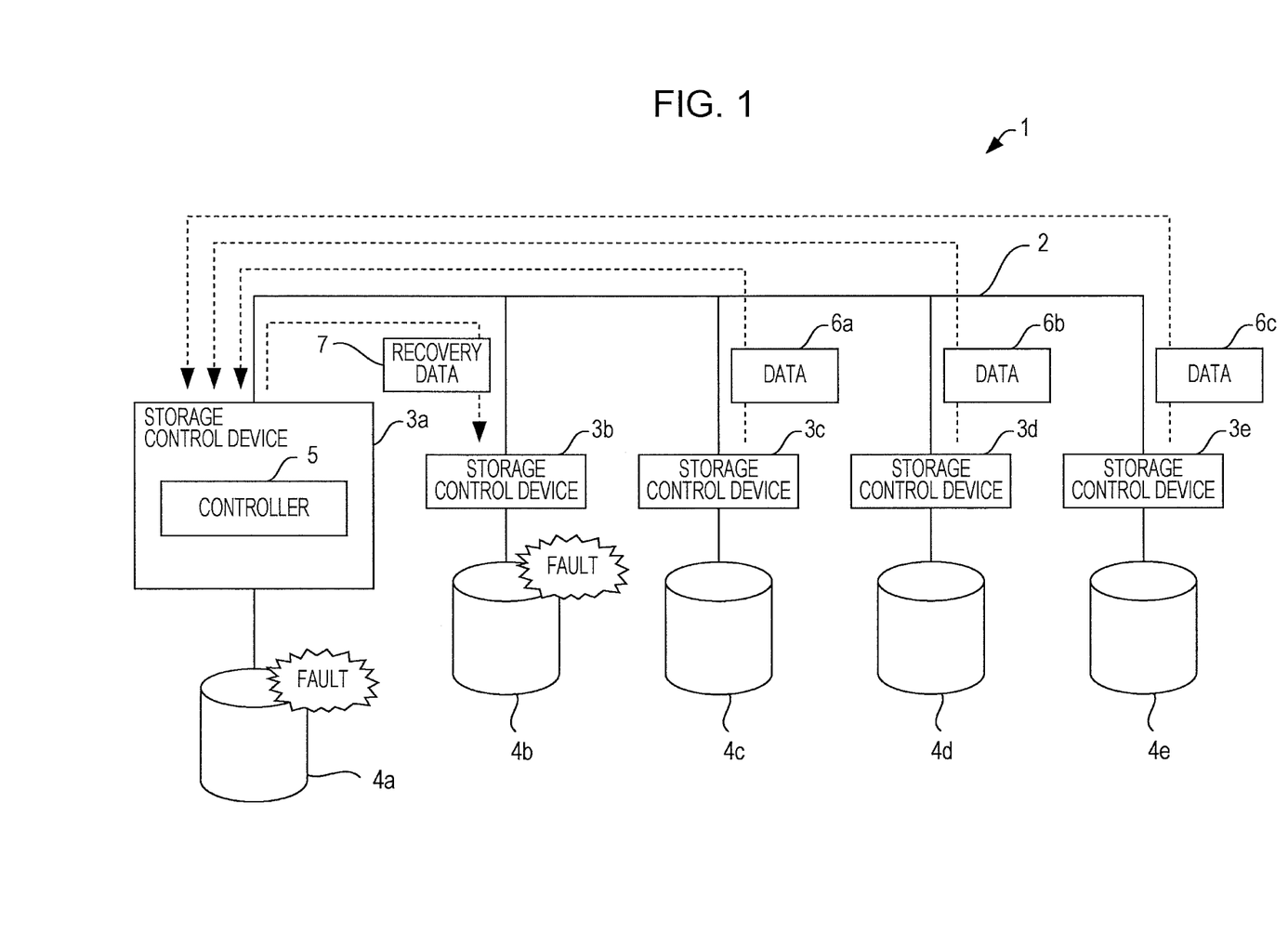
FIG. 1 is a diagram illustrating an exemplary configuration of a storage system according to a first embodiment.

A storage system according to a first embodiment will be described with reference to FIG. 1. FIG. 1 is a diagram illustrating an exemplary configuration of a storage system according to the first embodiment.

A storage system 1 is a distributed storage system in which a plurality of storage control devices 3 (3a, 3b, 3c, 3d, and 3e) are connected one another via a network 2. The storage system 1, for example, provides cloud storage to a user.

Storage devices 4 (4a, 4b, 4c, 4d, and 4e) to be controlled are connected to the storage control devices 3. The storage devices 4a, 4b, 4c, 4d, and 4e are connected to the storage control devices 3a, 3b, 3c, 3d, and 3e, respectively, so as to be controlled. The storage device 4 is, for example, a disk device such as a hard disk drive (HDD) or a solid state drive (SSD: flash memory drive), and holds data. Note that while one storage device 4 is connected to one storage control device 3 in FIG. 1, connected storage devices 4 are not limited to this and two or more storage devices 4 may be connected to one storage control device 3.

The storage control device 3 includes a controller 5. The controller 5 acquires, from other storage control devices 3, data 6 for use in recovery from a fault that has occurred in the storage device 4 to be controlled. For example, in a case where a fault has occurred in the storage device 4a (a first storage device) to be controlled by the storage control device 3a, the storage control devices 3b, 3c, 3d, and 3e serve as other storage control devices 3 for the storage control device 3a. The controller 5 acquires data 6a, 6b, and 6c from the storage control devices 3c, 3d, and 3e, respectively, among the storage control devices 3b, 3c, 3d, and 3e. The data 6a, 6b, and 6c are data that the storage control device 3a will use for recovery from the fault that has occurred in the storage device 4a.

In a case where a fault has occurred in a storage device 4 (a second storage device) controlled by another storage control device 3, the controller 5 derives recovery data 7 for use in recovery of the second storage device from the data 6 for use in recovery of the first storage device. For example, in a case where a fault has occurred in the storage device 4b to be controlled by the storage control device 3b, which serves as another storage control device for the storage control device 3a, the controller 5 derives the recovery data 7 for use in recovery of the storage device 4b using the data 6a, 6b, and 6c. Note that the data 6 for deriving the recovery data 7 is the data 6 used for recovery of the storage device 4b by the storage control device 3b among the data 6 acquired by the controller 5, and is part or the entirety of the data 6 acquired by the controller 5.

The controller 5 sends notification of the recovery data 7 to another storage control device 3 that controls the storage device 4 where the fault has occurred. For example, the controller 5 notifies the storage control device 3b of the recovery data 7.

This makes it unnecessary for the storage control device 3 in charge of recovery of the second storage device to acquire, from other storage control devices 3, the data 6 corresponding to part or the entirety of the data 6 acquired by the controller 5. Accordingly, with this storage control device 3, the communication load of the network 2 may be reduced in the storage system 1. Additionally, since the storage control device 3 in charge of recovery of the first storage device derives the recovery data 7 from the acquired data 6, the communication load of the network 2 may be reduced when the amount of data is decreased. Additionally, with the storage system 1, overhead for communication may be reduced when the storage control device 3 in charge of recovery of the second storage device acquires the data 6 for use in recovery.

Second Embodiment

Figure 2:
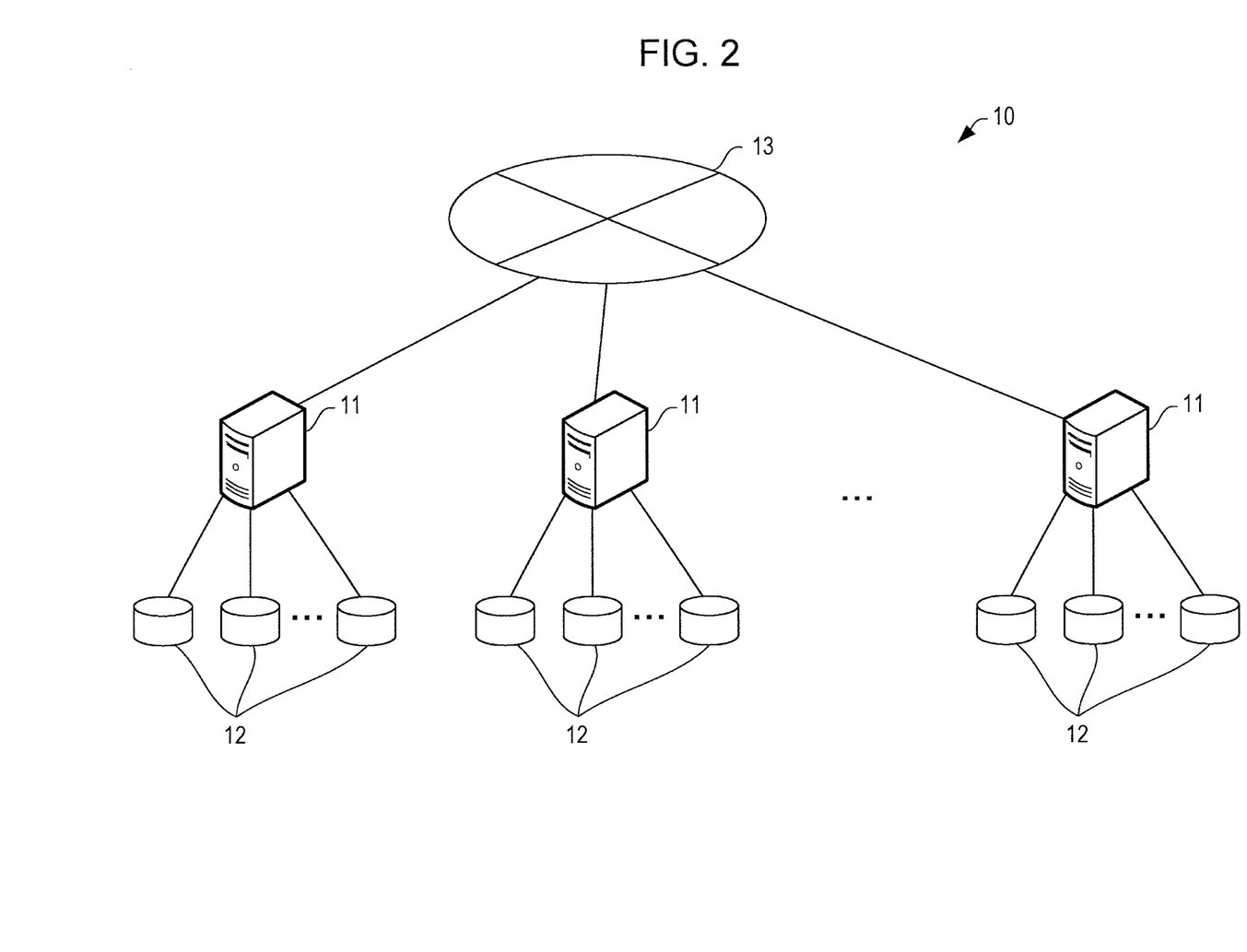
FIG. 2 is a diagram illustrating an exemplary configuration of a storage system according to a second embodiment.

Next, a configuration of a storage system according to a second embodiment will be described with reference to FIG. 2. FIG. 2 is a diagram illustrating an exemplary configuration of a storage system according to the second embodiment.

A storage system 10 is a distributed storage system in which a plurality of (for example, several hundred) servers 11 are connected via a network 13. The storage system 10, for example, provides cloud storage to a user.

The storage system 10 ensures reliability and availability by using RAID, which is mentioned as a typical technique of an erasure code. When the storage system 10 includes a sufficient number of servers 11, the storage system 10 is designed so as to avoid a situation where two or more disk devices 12 included in one RAID are controlled by the same server 11. Consequently, when attention is given to one RAID group, each server 11 manages at most one disk device 12.

One or more disk devices 12 are connected to the server 11. The disk device 12 is, for example, an HDD or an SSD. The disk device 12 corresponds to the storage device 4 according to the first embodiment, and the server 11 corresponds to the storage control device 3 according to the first embodiment.

The storage system 10 may be built within one data center, or may be built across two or more data centers at remote locations. In a case where the storage system 10 is built across two or more data centers at remote locations, the network 13 includes a network via which the data centers are connected.

Figure 3:
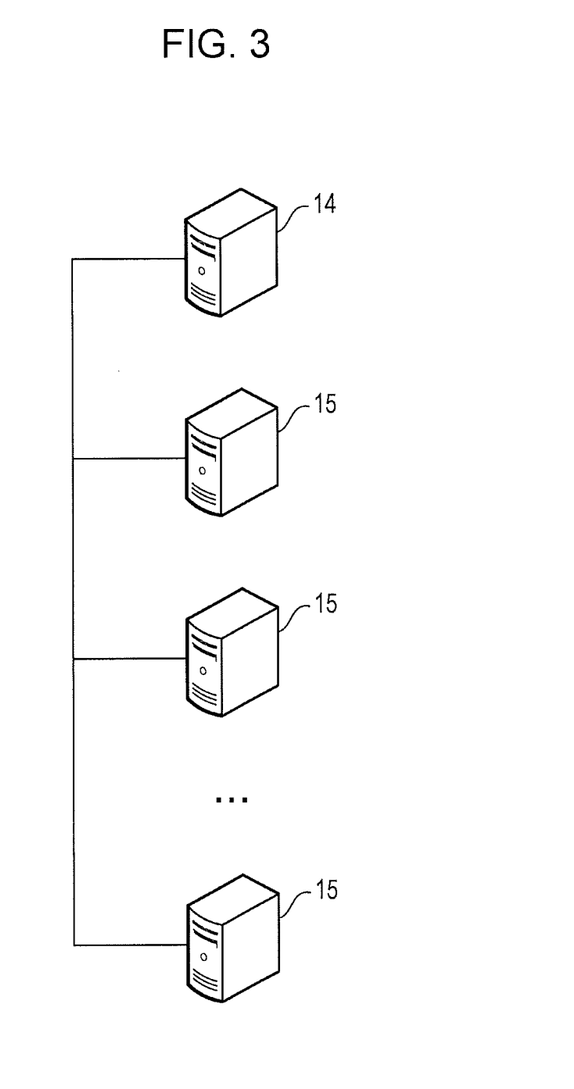
FIG. 3 is a diagram illustrating an exemplary node configuration of the storage system according to the second embodiment.

Next, a node configuration of the storage system 10 according to the second embodiment will be described with reference to FIG. 3. FIG. 3 is a diagram illustrating an exemplary node configuration of the storage system 10 according to the second embodiment.

The servers 11 function as management nodes 15 that manage the disk devices 12 in the storage system 10. One server 11 functions as a control node 14 in the storage system 10. The control node 14 controls a recovery procedure at the time of occurrence of a fault in a management node 15. Note that the control node 14 also serves as the management node 15. Occurrence of a fault in a management node 15 includes a fault of a disk device 12 managed by the management node 15. Note that one control node 14 may be set in the storage system 10, or may be set for each RAID group.

Figure 4:
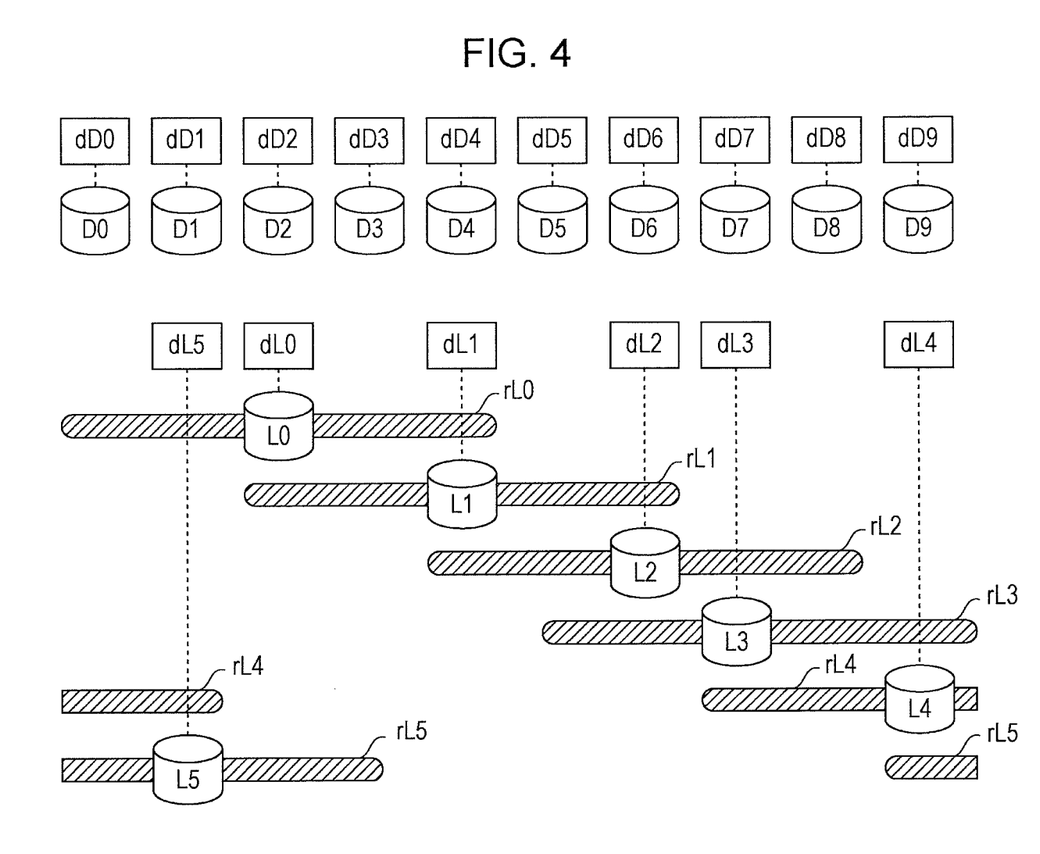
FIG. 4 is a diagram illustrating an exemplary RAID configuration of the storage system according to the second embodiment.

Next, a RAID configuration of the storage system 10 according to the second embodiment will be described with reference to FIG. 4. FIG. 4 is a diagram illustrating an exemplary RAID configuration of the storage system 10 according to the second embodiment.

The RAID group illustrated in FIG. 4 includes ten data disks, from a disk device D0 to a disk device D9, and six parity disks, from a disk device L0 to a disk device L5. The data disks and the parity disks are managed by respective different management nodes 15. One of the management nodes 15 functions as a control node 14. The control node 14 is set in advance and is, for example, a management node 15 that manages the disk device D0.

For the disk device L0, the disk devices D0, D1, D2, D3, and D4 are included in a range rL0 of data disks for parity computation. For the disk device L1, the disk devices D2, D3, D4, D5, and D6 are included in a range rL1 of data disks for parity computation. For the disk device L2, the disk devices D4, D5, D6, D7, and D8 are included in a range rL2 of data disks for parity computation. For the disk device L3, the disk devices D5, D6, D7, D8, and D9 are included in a range rL3 of data disks for parity computation. For the disk device L4, the disk devices D0, D1, D7, D8, and D9 are included in a range rL4 of data disks for parity computation. For the disk device L5, the disk devices D0, D1, D2, D3, and D9 are included in a range rL5 of data disks for parity computation.

Note that such parity computed using some of the data disks is referred to as "local parity". In the RAID group illustrated in FIG. 4, each parity disk holds local parity. However, a parity disk may hold parity computed using all the data disks.

Here, it is assumed that two disk devices D2 and D6 have simultaneously become faulty. In existing systems, recovery operations for the two disk devices D2 and D6 are independently performed. Instead, in the storage system 10, the control node 14 controls the recovery operations for the disk devices D2 and D6. The control node 14 decides to perform recovery operations for the disk device D2 earlier between the disk devices D2 and D6.

Thus, a management node 15 that manages the disk device D2 performs recovery operations for the disk device D2 earlier than recovery operations for the disk device D6 is performed.

Figure 5:
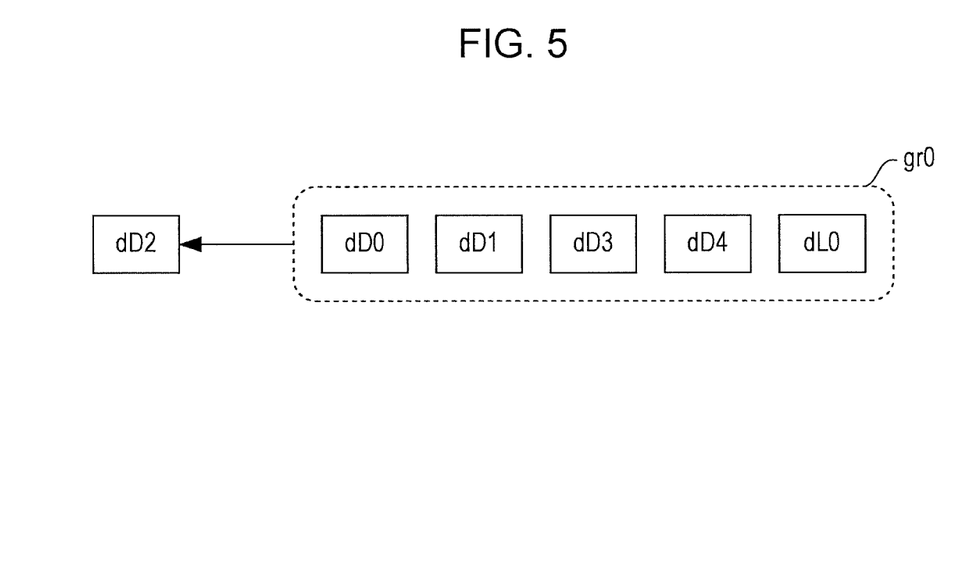
FIG. 5 is a diagram illustrating an example of a disk set used for recovery of a disk device for which recovery operations are performed earlier in the second embodiment.

Here, a disk set used for recovery of the disk device D2 for which recovery operations are performed earlier will be described with reference to FIG. 5. FIG. 5 is a diagram illustrating an example of a disk set used for recovery of the disk device D2 for which recovery operations are performed earlier in the second embodiment.

The data dD2 is data to be recovered for the disk device D2. The data dD0, dD1, dD3, dD4, and dL0 are data to be acquired from the disk devices D0, D1, D3, D4, and L0, respectively, for recovering the data dD2.

Here, assuming that a disk set for recovering the data dD2 is a disk set gr0, the elements of the disk set gr0 are {the disk devices D0, D1, D3, D4, L0}.

Figure 6:
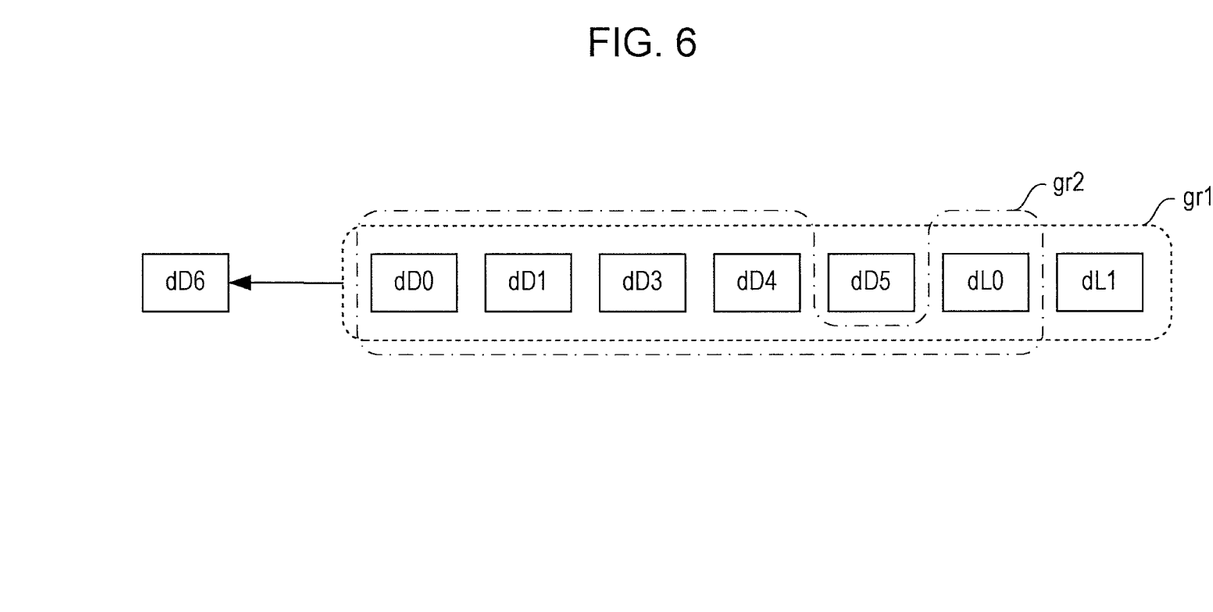
FIG. 6 is a diagram illustrating an example of a disk set used for recovery of a disk device for which recovery operations are performed subsequently to the disk device for which recovery operations have been performed earlier in the second embodiment.

Next, a disk set used for recovery of the disk device D6 for which recovery operations are performed subsequently to recovery of the disk device D2 for which recovery operations have been performed earlier will be described with reference to FIG. 6. FIG. 6 is a diagram illustrating an example of a disk set used for recovery of the disk device D6 for which recovery operations are performed subsequently to recovery of the disk device D2 for which recovery operations have been performed earlier in the second embodiment.

The data dD6 is data to be recovered for the disk device D6. The data dD0, dD1, dD3, dD4, dD5, dL0, and dL1 are data to be acquired from the disk devices D0, D1, D3, D4, D5, L0, and L1, respectively, for recovering the data dD6.

Here, assuming that a disk set for recovering the data dD6 is a disk set gr1, the elements of the disk set gr1 are {the disk devices D0, D1, D3, D4, D5, L0, L1}.

Assuming that an amount of data transfer from one disk device for data recovery is one unit, an amount of data transfer for recovery of the data dD2 is five units corresponding to the number of elements of the disk set gr0. Similarly, an amount of data transfer for recovery of the data dD6 is seven units corresponding to the number of elements of the disk set gr1. That is, a total amount of data transfers for recovery of the data dD2 and the data dD6 is 12 units, and thus a large communication load is sometimes imposed on the network 13 in the storage system 10.

Assuming that the intersection of the disk set gr0 and the disk set gr1 is a disk set gr2, the elements of the disk set gr2 are {the disk devices D0, D1, D3, D4, L0}.

The elements of the disk set gr2 are acquired earlier by the management node 15 that manages the disk device D2 for recovering the data dD2. The management node 15 that manages the disk device D2 performs a computation for recovering the data dD6, and sends notification of a computation result to the management node 15 that manages the disk device D6. The management node 15 that manages the disk device D6 acquires the computation result from the management node 15 that manages the disk device D2. Therefore, it becomes unnecessary to receive data transfers from the disk devices that form elements of the disk set gr2.

As a result, the amount of data transfer for recovery of the data dD6 is three units obtained by adding one unit corresponding to the computation result to a difference between the number of elements of the disk set gr1 and the number of elements of the disk set gr2. That is, the total amount of data transfers for recovery of the data dD2 and the data dD6 is eight units. Accordingly, the management node 15 that performs recovery operations earlier bears part of a computation of the management node 15 that subsequently performs recovery operations. This enables the communication load imposed on the network 13 in the storage system 10 to be reduced by about one-third (=(12−8)/12).

Note that the management node 15 that performs recovery operations earlier bears part of a computation of the management node 15 that subsequently performs recovery operations, in the following way.

The data of the parity disks L0 and L1 are denoted by $L_0$ and $L_1$, respectively. The data of the data disks D0, D1, D2, D3, D4, D5, and D6 are denoted by $D_0$, $D_1$, $D_2$, $D_3$, $D_4$, $D_5$, and $D_6$, respectively. At this point, in linear parity computation, $L_0$ and $L_1$ may be expressed generally as operations on the Galois field by equation (1) and equation (2), respectively. Note that $a_{ij}$ is a desired coefficient corresponding to a combination of a parity disk (i) and a data disk (j). The coefficient $a_{ii}$ is, for example, "1".

$$L_0 = a_{00}D_0 + a_{01}D_1 + a_{02}D_2 + a_{03}D_3 + a_{04}D_4 \qquad (1)$$

$$L_1 = a_{12}D_2 + a_{13}D_3 + a_{14}D_4 + a_{15}D_5 + a_{16}D_6 \qquad (2)$$

Transforming equation (1) and equation (2) yields equation (3) and equation (4).

At this point, assuming that the computation performed by the management node 15 that performs recovery operations earlier is denoted by F, and the coefficient of each element is denoted by $b_k$, equation (5) is obtained from equation (4).

$$D_2 = \{L_0 - a_{00}D_0 - a_{01}D_1 - a_{03}D_3 - a_{04}D_4\}/a_{02} \qquad (3)$$

$$D_6 = \{L_1 - a_{12}D_2 - a_{13}D_3 - a_{14}D_4 - a_{15}D_5\}/a_{16} \qquad (4)$$

$$D_6 = b_0 F(D_0, D_1, D_3, D_4, L_0) + b_1 D_5 + b_2 L_1 \qquad (5)$$

That is, the management node 15 that performs recovery operations earlier transfers "$F(D_0, D_1, D_3, D_4, L_0)$" to the management node 15 that subsequently performs recovery operations. This allows the amount of data transfer for recovery operations to be optimized (or reduced).

Figure 7:
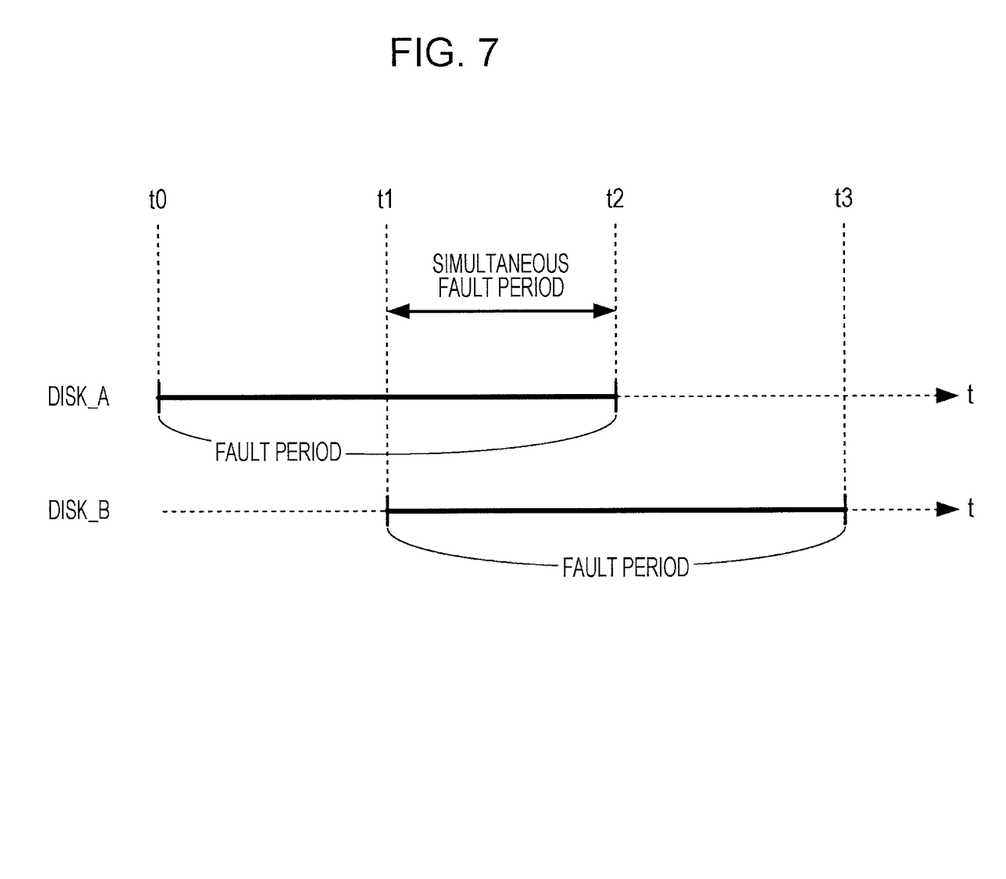
FIG. 7 is a diagram illustrating an example of detection of simultaneous faults of disk devices according to the second embodiment.

Next, simultaneous faults of disk devices will be described with reference to FIG. 7. FIG. 7 is a diagram illustrating an example of detection of simultaneous faults of disk devices according to the second embodiment.

Of two disk devices 12, the disk device 12 that has become faulty earlier is denoted as a disk_A, and the disk device 12 that has become faulty later is denoted as a disk_B. Note that there is a relationship between the disk_A and the disk_B such that there is an intersection of the data disks and the parity disk used for recovery of the disk_A and the data disks and the parity disk used for recovery of the disk_B.

The disk_A becomes faulty at a timing t0 and is recovered at a timing t2. The disk_B becomes faulty at a timing t1 and is recovered at a timing t3. The fault periods of the disk_A and the disk_B match between the timing t1 and the timing t2.

A management node 15 that manages the disk_A detects a fault of the disk_A and notifies the control node 14 of detection of the fault of the disk_A. Thus, the control node 14 detects the fault of the disk_A. A management node 15 that manages the disk_B detects a fault of the disk_B and notifies the control node 14 of detection of the fault of the disk_B. Thus, the control node 14 detects the fault of the disk_B.

Accordingly, the control node 14 detects simultaneous faults of the disk_A and the disk_B. Note that, in a case where the disk devices 12 have become faulty simultaneously because of a disaster or the like, assuming that the timing t0≈the timing t1, the control node 14 detects the simultaneous faults of the disk_A and the disk_B.

Figure 8:
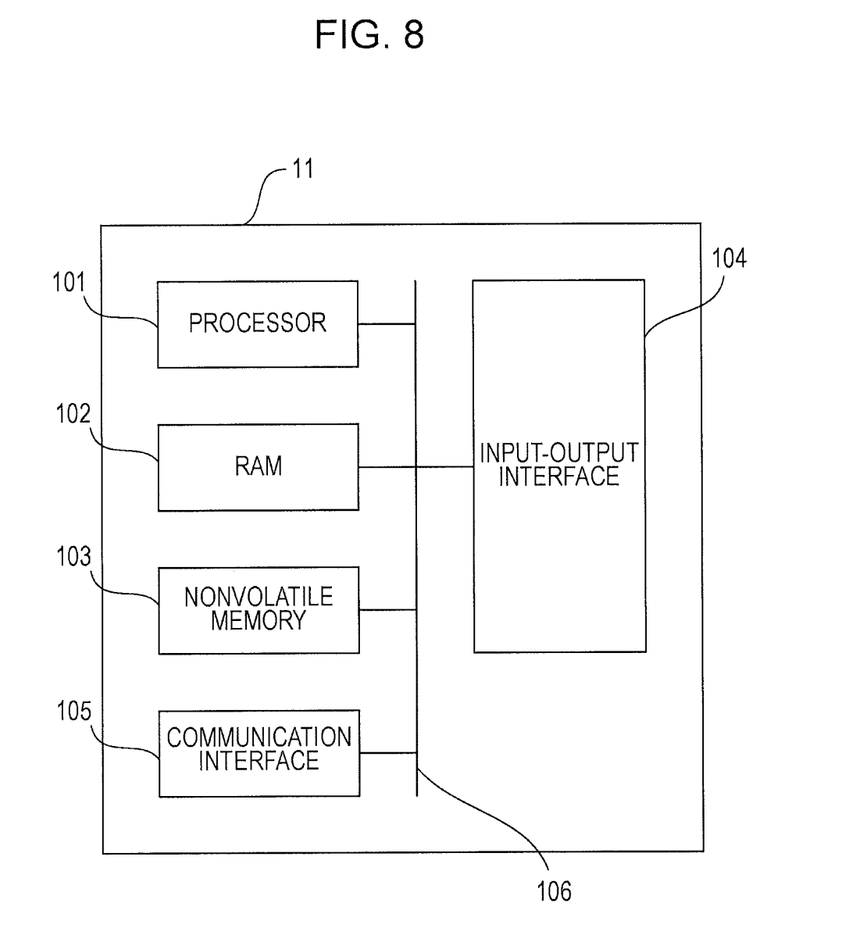
FIG. 8 is a diagram illustrating an exemplary hardware configuration of a server according to the second embodiment.

Next, a hardware configuration of the server 11 according to the second embodiment will be described with reference to FIG. 8. FIG. 8 is a diagram illustrating an exemplary hardware configuration of the server 11 according to the second embodiment.

The entirety of the server 11 is controlled by a processor 101. That is, the processor 101 functions as a controller of the server 11. A random access memory (RAM) 102 and a plurality of peripheral devices are connected to the processor 101 via a bus 106. The processor 101 may be a multiprocessor. The processor 101 may be, for example, a central processing unit (CPU), a micro processing unit (MPU), a digital signal processor (DSP), an application specific integrated circuit (ASIC), or a programmable logic device (PLD). The processor 101 may also be a combination of two or more elements among the CPU, the MPU, the DSP, the ASIC, and the PLD.

The RAM 102 is used as a main storage device of the server 11. At least part of the program of an operating system (OS), firmware, and application programs executed by the processor 101 are temporarily stored in the RAM 102. Various kinds of data used for processing performed by the processor 101 are also stored in the RAM 102. The RAM 102 may include a cache memory in addition to the memory for storage of various kinds of data. That is, the RAM 102 functions as a storage unit of the server 11.

The peripheral devices connected to the bus 106 include a nonvolatile memory 103, an input-output interface 104, and a communication interface 105.

The nonvolatile memory 103 holds the content of storage even when the server 11 is powered off. The nonvolatile memory 103 is, for example, a semiconductor storage device such as an electrically erasable programmable read-only memory (EEPROM) or a flash memory, or an HDD. The nonvolatile memory 103 is used as an auxiliary storage device of the server 11. The program of the OS, firmware, application programs, and various kinds of data are stored in the nonvolatile memory 103. That is, the nonvolatile memory 103 functions as a storage unit of the server 11.

The input-output interface 104 is connected to input-output devices to perform input and output. The input-output devices include storage devices such as the disk devices 12.

The communication interface 105 is connected to the network 13 so as to transmit and receive data to and from other servers 11 and a host over the network 13.

With a hardware configuration as described above, the processing functions of the server 11 according to the second embodiment may be implemented. Note that, in addition to the server 11, the storage control device 3 according to the first embodiment may be implemented with hardware similar to the server 11 illustrated in FIG. 8.

The server 11 implements the processing functions according to the second embodiment, for example, by executing a program recorded on a computer-readable recording medium. The program that describes the content of processing executed by the server 11 may be recorded on various recording media. For example, programs executed by the server 11 may be stored in the nonvolatile memory 103. The processor 101 loads at least some of the programs in the nonvolatile memory 103 into the RAM 102 and executes the programs. The program executed by the server 11 may be recorded on a portable recording medium (not illustrated), such as an optical disk, a memory device, or a memory card. Examples of the optical disk include a digital versatile disc (DVD), a DVD-RAM, a compact disc read only memory (CD-ROM), and a CD-recordable (R)/rewritable (RW). The memory device is a recording medium equipped with a function for communicating with the input-output interface 104 or a device connection interface (not illustrated). For example, the memory device may write data to a memory card or read data from the memory card by using a memory reader/writer. A memory card is a card-type recording medium.

The program stored in the portable recording medium is installed in the nonvolatile memory 103, for example, under control of the processor 101, and then becomes executable. The processor 101 may also read a program directly from the portable recording medium to execute the program.

Figure 9:
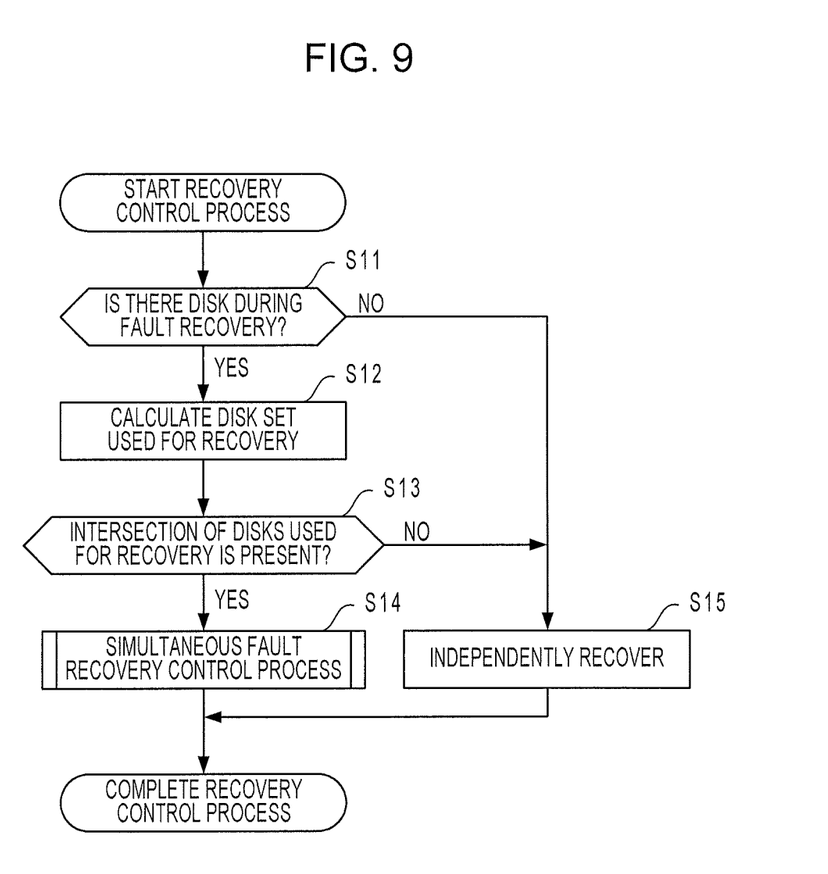
FIG. 9 is a flowchart of a recovery control process according to the second embodiment.

Next, a recovery control process according to the second embodiment will be described with reference to FIG. 9. FIG. 9 is a flowchart of a recovery control process according to the second embodiment.

The recovery control process is a process for controlling a recovery procedure for the management node 15 where a fault has occurred. The recovery control process is a process performed by the control node 14 upon receipt of a fault notification from the management node 15.

(S11) The control node 14 determines whether or not, aside from the disk of the received fault notification, there is a disk that is during fault recovery. When, aside from the disk of the received fault notification, there is a disk that is during fault recovery, the control node 14 proceeds to S12, whereas when, aside from the disk of the received fault notification, there is no disk that is during fault recovery, the control node 14 proceeds to S15. Note that, by managing the progress of recovery performed by the management node 15, the control node 14 may determine whether or not there is a disk that is during fault recovery. For example, the control node 14 may hold, in a storage unit, a management table for managing the state of the management node 15 to manage the progress of recovery performed by the management node 15.

(S12) The control node 14 computes a disk set used for recovery of the disk of the received fault notification.

(S13) The control node 14 computes an intersection of a disk set used for recovery of the disk that is during fault recovery and a disk set used for recovery of the disk of the received fault notification to determine whether the intersection is present or absent. When the intersection is present, the control node 14 proceeds to S14, whereas when the intersection is absent, that is, when the intersection is an empty set, the control node 14 proceeds to S15.

(S14) The control node 14 performs a simultaneous fault recovery control process. The simultaneous fault recovery control process is a process for controlling the recovery control procedure for two faulty disks whose disk sets used for recovery have a shared portion. Details of the simultaneous fault recovery control process will be described later with reference to FIG. 10. After performing the simultaneous fault recovery control process, the control node 14 completes the recovery control process.

(S15) Since two disk sets used for recovery of the two faulty disks have no shared portion, the control node 14 issues an instruction on a procedure for independent recovery of the disk of the received fault notification, and then completes the recovery control process.

In such a way, the control node 14 may discriminate the simultaneous fault recovery, which enables the communication load on the network 13 to be reduced, from the fault recovery that is independently performed and may issue an instruction to the management node 15.

Figure 10:
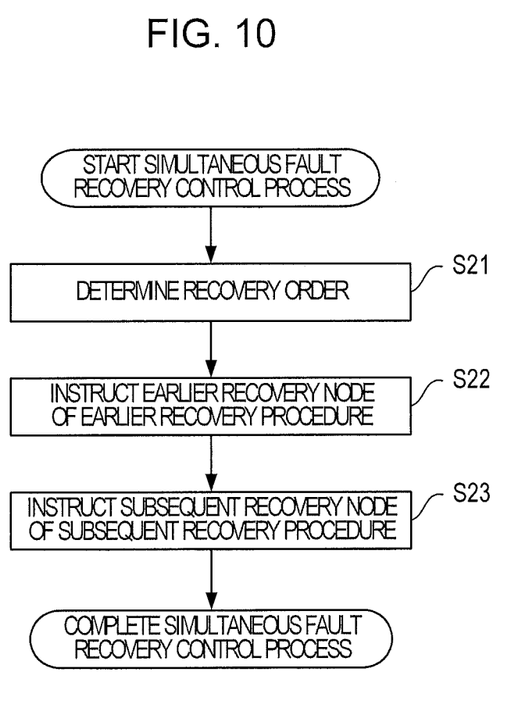
FIG. 10 is a flowchart of a simultaneous fault recovery control process according to the second embodiment.

Next, the simultaneous fault recovery control process according to the second embodiment will be described with reference to FIG. 10. FIG. 10 is a flowchart of the simultaneous fault recovery control process according to the second embodiment.

The simultaneous fault recovery control process is a process for controlling a recovery control procedure of two faulty disks whose disk sets used for recovery have a shared portion. The simultaneous fault recovery control process is a process performed by the control node 14 in S14 of the recovery control process.

(S21) The control node 14 determines the recovery order, that is, which of the disk of the received fault notification and the disk that is during fault recovery will be recovered earlier. For example, the control node 14 may set in advance which of the disk of the received fault notification and the disk that is during fault recovery will be recovered earlier, or may determine the recovery order on the basis of desired conditions, such as the order of priorities of the disks and the operating states of the disks.

(S22) The control node 14 instructs the management node 15 (earlier recovery node), which will perform recovery earlier, on a procedure (earlier recovery procedure) for performing recovery earlier. The earlier recovery procedure includes a disk set used for recovery of a faulty disk performed by the earlier recovery node, a computational expression of a computation performed by the earlier recovery node for another management node, and the transfer destination of a computation result.

(S23) The control node 14 instructs the management node 15 (subsequent recovery node), which will perform recovery subsequently, on a procedure (subsequent recovery procedure) for performing recovery subsequently. The subsequent recovery procedure includes a disk set used for recovery of a faulty disk made by the subsequent recovery node, the computational expression of the computation performed by the earlier recovery node, and the transfer source of the computation result. After instructing the subsequent recovery node on the subsequent recovery procedure, the control node 14 completes the simultaneous fault recovery control process.

Thus, the earlier recovery node and the subsequent recovery node may perform fault recovery in cooperation with each other under control of the control node 14.

Figure 11:
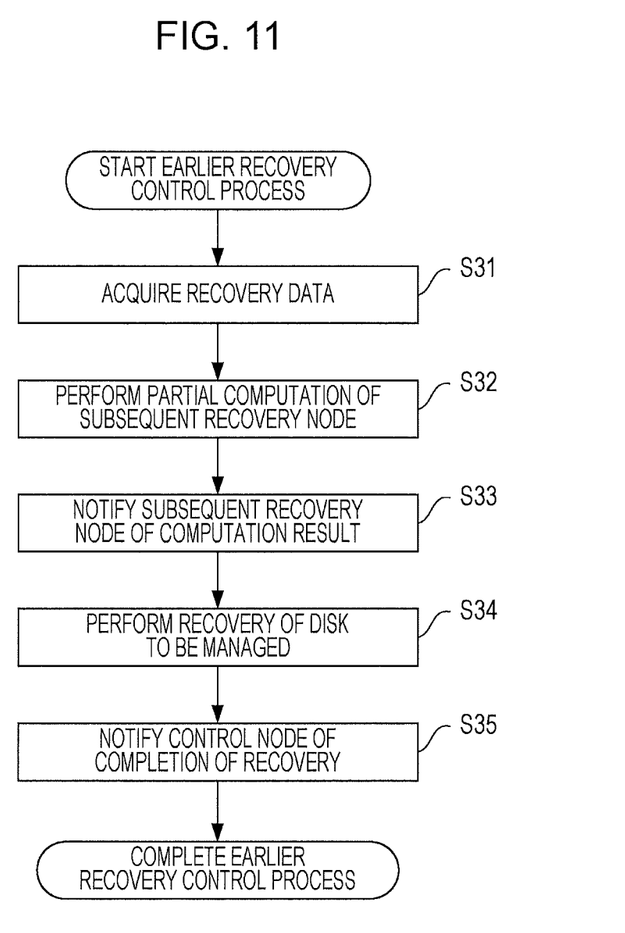
FIG. 11 is a flowchart of an earlier recovery control process according to the second embodiment.

Next, the earlier recovery control process according to the second embodiment will be described with reference to FIG. 11. FIG. 11 is a flowchart of the earlier recovery control process according to the second embodiment.

The earlier recovery control process is a recovery process performed by the earlier recovery node. The earlier recovery control process is a process performed by the management node 15 instructed of the earlier recovery procedure by the control node 14.

(S31) The management node 15 (earlier recovery node) acquires recovery data on the basis of the disk set instructed in the earlier recovery procedure. The management node 15 may acquire recovery data through management nodes 15 managing the disk devices 12 corresponding to the elements of the disk set. Note that, if the management node 15 has already acquired the recovery data, it is unnecessary for the management node 15 to acquire the recovery data again. For example, in the case where, after the management node 15 has independently performed recovery operations, a fault forming a simultaneous fault occurs in another management node 15, the management node 15 has already acquired recovery data at the time of the start of the earlier recovery control process.

(S32) The management node 15 performs a partial computation (a computation performed by the earlier recovery node instead of the subsequent recovery node) for the subsequent recovery node in accordance with the computational expression instructed in the earlier recovery procedure.

(S33) The management node 15 notifies the subsequent recovery node of a computation result.

(S34) The management node 15 performs recovery of a disk to be managed.

(S35) The management node 15 notifies the control node 14 of completion of recovery, and then completes the earlier recovery control process.

In such a way, since the earlier recovery node bears, instead of the subsequent recovery node, part of a computation involved in recovery performed by the subsequent recovery node, the load of recovery imposed on the subsequent recovery node may be reduced. The earlier recovery node performs the partial computation of the subsequent recovery node in advance. This reduces a time lag caused by recovery of the subsequent recovery node. The earlier recovery node may use the computation result of the partial computation, which is performed in advance instead of the subsequent recovery node, for recovery of a disk managed by the earlier recovery node itself.

Figure 12:
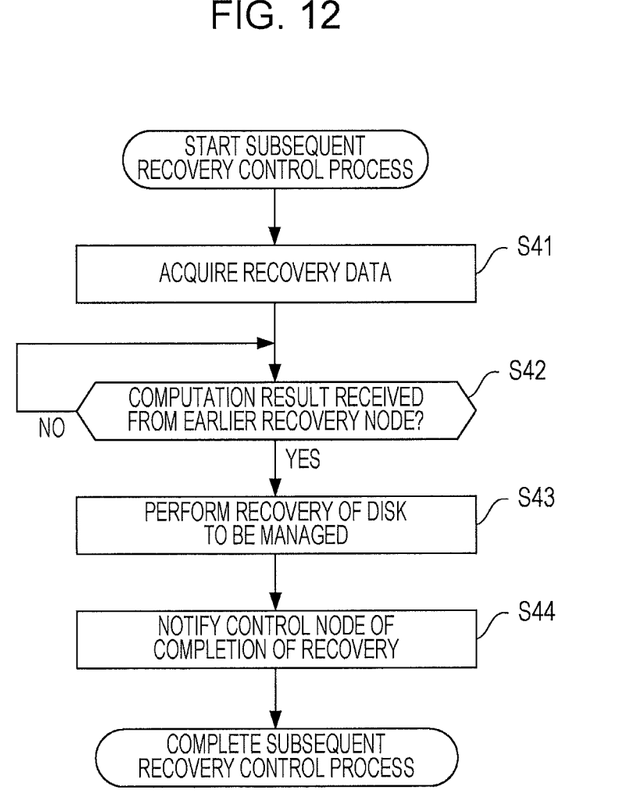
FIG. 12 is a flowchart of a subsequent recovery control process according to the second embodiment.

Next, the subsequent recovery control process according to the second embodiment will be described with reference to FIG. 12. FIG. 12 is a flowchart of the subsequent recovery control process according to the second embodiment.

The subsequent recovery control process is a recovery process performed by the subsequent recovery node. The subsequent recovery control process is a process performed by the management node 15 instructed of the subsequent recovery procedure by the control node 14.

(S41) The management node 15 (subsequent recovery node) acquires recovery data on the basis of the disk set instructed in the subsequent recovery procedure. The management node 15 may acquire recovery data through the management nodes 15 managing the disk devices 12 corresponding to elements of the disk set.

(S42) The management node 15 determines whether or not the computation result has been received from the earlier recovery node. When the computation result has been received from the earlier recovery node, the management node 15 proceeds to S43. When the computation result has not been received from the earlier recovery node, the management node 15 waits for receipt of the computation result from the earlier recovery node.

(S43) Using the acquired recovery data and the computation result, the management node 15 performs recovery of a disk to be managed.

(S44) The management node 15 notifies the control node 14 of completion of recovery, and then completes the subsequent recovery control process.

In such a way, use of a computation result made by the earlier recovery node may reduce the amount of data for recovery collected by the subsequent recovery node. Thus, the storage system 10 may reduce the load imposed on the network band in the network 13. Accordingly, even in the case where recovery of a faulty disk is performed in the background of the service provided to a user, the storage system 10 may limit the effects on the user applications.

Note that although the storage system 10 sets the control node 14 in advance, one of the management nodes 15 that manages a faulty disk may be set as the control node 14. For example, a management node 15 that has detected a faulty disk may serve as the control node 14 after confirming that there is no management node 15 serving as another control node 14 with the management nodes 15 that manage the disk devices 12 forming a RAID group.

While illustrative examples of the storage control device 3 and the server 11 have been described above, the embodiments are applicable to other information processing devices.

Note that the processing functions described above may be implemented by a computer. In that case, there is provided a program that describes the processing content of functions of the storage control device 3 or the server 11. The program is executed by the computer and thus the above-described processing functions are implemented on the computer. The program that describes the processing functions may be recorded on a computer-readable recording medium. Examples of the computer-readable recording medium include a magnetic storage device, an optical disk, a magneto-optical recording medium, and a semiconductor memory. Examples of the magnetic storage device include an HDD, a flexible disk (FD), and a magnetic tape. Examples of the optical disk include a DVD, a DVD-RAM, and a CD-ROM/RW. Examples of the magneto-optical recording medium include a magneto-optical disk (MO).

When the program is circulated, a portable recording medium, such as a DVD or a CD-ROM, on which the program is recorded is sold, for example. The program may be stored in a storage device of a server computer and be transferred over a network from the server computer to another computer.

A computer that executes the program stores, in its storage device, the program recorded on the portable recording medium or the program transferred from the server computer. Then, the computer reads the program from its storage device and executes processing according to the program. Note that the computer may also read the program directly from the portable recording medium and executes processing according to the program. In addition, each time the program is transferred from the server computer connected over the network, the computer may execute processing according to the received program.

At least some of the processing functions described above may be implemented by an electronic circuit such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device, comprising:
   a memory; and
   a processor coupled to the memory and the processor configured to:
   acquire, in response to occurrence of a first fault in a first storage device included in a first set of storage devices among a plurality of storage devices, first recovery data to be used in recovery of the first faulty storage device, from the first set of storage devices, the first faulty storage device being controlled by the storage control device as a first storage control device,
   derive, in response to occurrence of a second fault in a second storage device included in a second set of storage devices among the plurality of storage devices, second recovery data from a part of the acquired first recovery data, the second recovery data to be used in recovery of the second faulty storage device, the part of the acquired first recovery data being acquired from a third set of storage devices being an intersection set of the first set and the second set of storage device, the intersection set including more than one storage device, and
   notify a second storage control device of the derived second recovery data, the second storage control device controlling the second faulty storage device.

2. The storage control device according to claim 1, wherein
   the processor is configured to perform, using the first recovery data, the recovery of the first storage device after the notification.

3. The storage control device according to claim 1, wherein at least first and second parity disks are respectively associated with the first and second sets of storage devices, the first and second recovery data include parity data obtained by linear computation from the first and second parity disks.

4. The storage control device according to claim 1, wherein
   the processor is configured to:
   acquire, as the first storage control device, in response to occurrence of a third fault in the first storage device included in the first set of storage devices, fourth recovery data to be used in recovery of the first faulty storage device, from a fourth set of storage devices,
   the fourth recovery data derived from a part of acquired fifth recovery data, the part of the acquired fifth recovery data being acquired from the fourth set of storage devices being an intersection set of the first set of storage devices and the second set of storage devices, and
   perform recovery of the first faulty storage device using the fourth recovery data.

5. A computer-readable recording medium having stored therein a program for causing a computer to execute a process comprising:
   acquiring, in response to occurrence of a first fault in a first storage device included in a first set of storage devices among a plurality of storage devices, first recovery data to be used in recovery of the first faulty storage device, from the first set of storage devices, the first faulty storage device being controlled by the storage control device as a first storage control device;
   deriving, in response to occurrence of a second fault in a second storage device included in a second set of storage devices among the plurality of storage devices, second recovery data from a part of the acquired first recovery data, the second recovery data to be used in recovery of the second faulty storage device, the part of the acquired first recovery data being acquired from a third set of storage devices being an intersection set of the first set and the second set of storage device, the intersection set including more than one storage device; and
   notifying a second storage control device of the derived second recovery data, the second storage control device controlling the second faulty storage device.

6. A data recovery method, comprising:
   by a processor coupled with a memory, to perform operations of:

acquiring in response to occurrence of a first fault in a first storage device included in a first set of storage devices among a plurality of storage devices, first recovery data to be used in recovery of the first faulty storage device, from the first set of storage, the first faulty storage device being controlled by the storage control device as a first storage control device;

deriving, in response to occurrence of a second fault in a second storage device included in a second set of storage devices among the plurality of storage devices, second recovery data from a part of the acquired first recovery data, the second recovery data to be used in recovery of the second faulty storage device, the part of the acquired first recovery data being acquired from a third set of storage devices being an intersection set of the first set and the second set of storage device, the intersection set including more than one storage device; and notifying a second storage control device of the derived second recovery data, the second storage control device controlling the second faulty storage device.

* * * * *